United States Patent [19]
Edahiro

[11] Patent Number: 5,944,836
[45] Date of Patent: Aug. 31, 1999

[54] CLOCK SIGNAL DISTRIBUTING CIRCUIT

[75] Inventor: Masato Edahiro, Tokyo, Japan

[73] Assignee: NEC Corporation, Tokyo, Japan

[21] Appl. No.: 08/822,464

[22] Filed: Mar. 21, 1997

[30] Foreign Application Priority Data

Mar. 21, 1996 [JP] Japan ................................. 8-063598

[51] Int. Cl.[6] .................................................. G06F 1/10
[52] U.S. Cl. ........................................................ 713/503
[58] Field of Search ............................ 395/558; 371/1; 326/41, 47, 93, 101

[56] References Cited

U.S. PATENT DOCUMENTS

| | | | |
|---|---|---|---|
| 5,502,819 | 3/1996 | Aldrich et al. | 395/553 |
| 5,586,307 | 12/1996 | Wong et al. | 395/551 |
| 5,625,805 | 4/1997 | Fenwick et al. | 395/558 |
| 5,628,000 | 5/1997 | Kashiyama et al. | 395/558 |
| 5,696,951 | 12/1997 | Miller | 395/558 |
| 5,712,579 | 1/1998 | Duong et al. | 326/93 |
| 5,732,249 | 3/1998 | Masuda et al. | 395/558 |

FOREIGN PATENT DOCUMENTS

| | | |
|---|---|---|
| 4-290261 | 10/1992 | Japan . |
| 7-121261 | 5/1995 | Japan . |

*Primary Examiner*—Thomas M. Heckler
*Attorney, Agent, or Firm*—Foley & Lardner

[57] ABSTRACT

The invention provides a clock signal distributing circuit wherein the position at which the buffer section is disposed is determined from the positions and characteristics of the clock signal input section and the load section and the characteristics of the buffer section and the wiring section, and wirings are made through the clock signal input section, one or more stage buffer sections, and the load section, so that the signal transmission delay time as well as the skew of clock signals can be adjusted.

18 Claims, 6 Drawing Sheets

CLOCK SIGNAL DISTRIBUTING CIRCUIT

BACKGROUND OF THE INVENTION

1. Field of the Invention

The present invention relates to a clock signal distributing circuit used in a semiconductor integrated circuit and the like.

2. Description of the Related Art

Conventionally, this type of the clock signal distributing circuit has been employed to decrease the skew of clock signals in a semiconductor integrated circuit, as disclosed, for example, in the Japanese Patent Laid-open No. Hei 4-290261. For a clock signal input means and a plurality of load means whose positions on a semiconductor chip are predetermined, a position of a buffer means is determined and wires are routed from the clock signal input means to the buffer means and from the buffer means to the load means, so as to decrease the skew of clock signals.

FIG. 6 is a chart showing an example for the conventional clock signal distributing circuit. In this clock signal distributing circuit, the position of the buffer means 61 is determined at a point whose X and Y coordinates are X0 and Y0, where X0 and Y0 is the mean value of X and Y coordinates of positions of the load means 62, respectively.

Since the buffer means 61 is placed in the forgoing manner, the difference in wiring distances between the buffer means 61 and each of the load means 62 should be small and the skew of clock signals should also be small.

However, in the conventional clock signal distributing circuit, the transmission delay time of clock signals is not calculated precisely, which is disadvantageous. Since the signal transmission delay time cannot be adjusted precisely, in some cases, the signal transmission delay time and the skew of the signal are not small enough and given conditions for the signal transmission delay and the skew are not satisfied.

This results from the fact that the positions of the buffer means 61 is determined only from the positions of the load means 62, that is, the mean value of the X and Y coordinates.

SUMMARY OF THE INVENTION

The present invention has been made in view of the foregoing problems, and an object of the invention is to provide a clock signal distributing circuit that can adjust the signal transmission delay time as well as adjust the skew of clock signals.

In order to achieve the foregoing object, the clock signal distributing circuit according to the invention comprises clock signal input means, buffer means, load means, and wiring means.

And, in the clock signal distributing circuit of the invention, the position of the buffer means is determined on the basis of the factors mentioned below, and wirings are made through the clock signal input means, one or more stage buffer means, and the load means; and thereby, the signal transmission delay time as well as the skew of the clock signals can be adjusted. The foregoing factors are: the position of the clock signal input means, the electric characteristics of resistors and capacitors and the like constituting the clock signal input means, and the output signal characteristics against the input signal waveform thereof; the positions of the load means, the electric characteristics of resistors and capacitors and the like constituting the load means, and the output signal characteristics against the input signal waveform thereof; the electric characteristics of resistors and capacitors and the like constituting the buffer means, and the output signal characteristics against the input signal waveform thereof; and the electric characteristics of wiring resistors and wiring capacitors constituting the wiring means.

BRIEF DESCRIPTION OF THE DRAWINGS

Other features and advantages will become apparent from the following detailed description when taken in conjunction with the accompanying drawings, in which.

DESCRIPTION OF THE PREFERRED EMBODIMENT

Preferred embodiments of the present invention will hereafter be described in detail with reference to the accompanying drawings.

Figure 1:
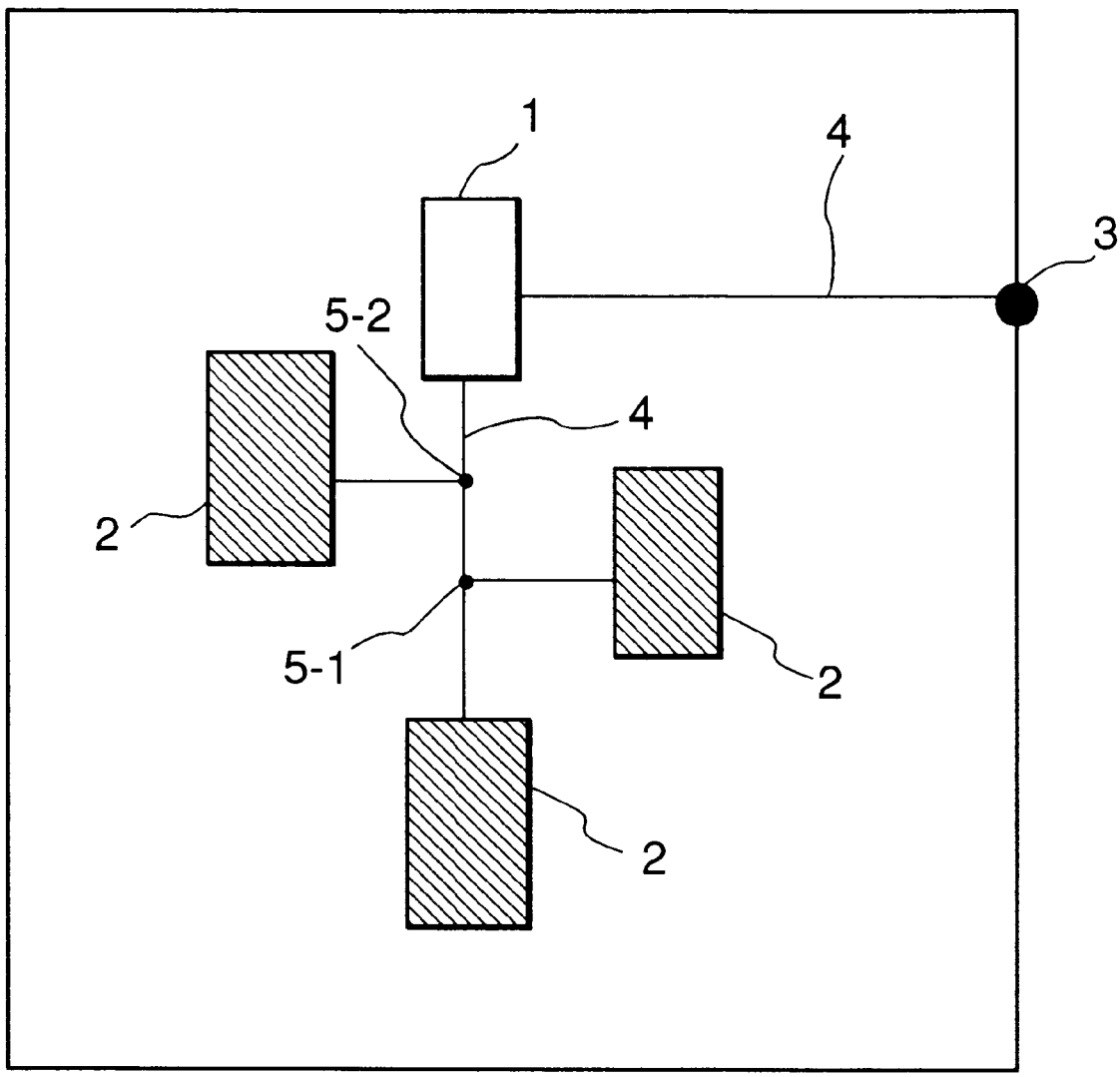
FIG. 1 illustrates a clock signal distributing circuit of one embodiment according to the present invention.

In FIG. 1, the position at which the buffer means 1 is placed is determined in the following manner. First, for each point on the semiconductor chip, the transmission delay is calculated on a path from the clock signal input 3 to the point where the buffer means 1 is placed at the point. The path is obtained by a router for semiconductor chips.

Figure 2:
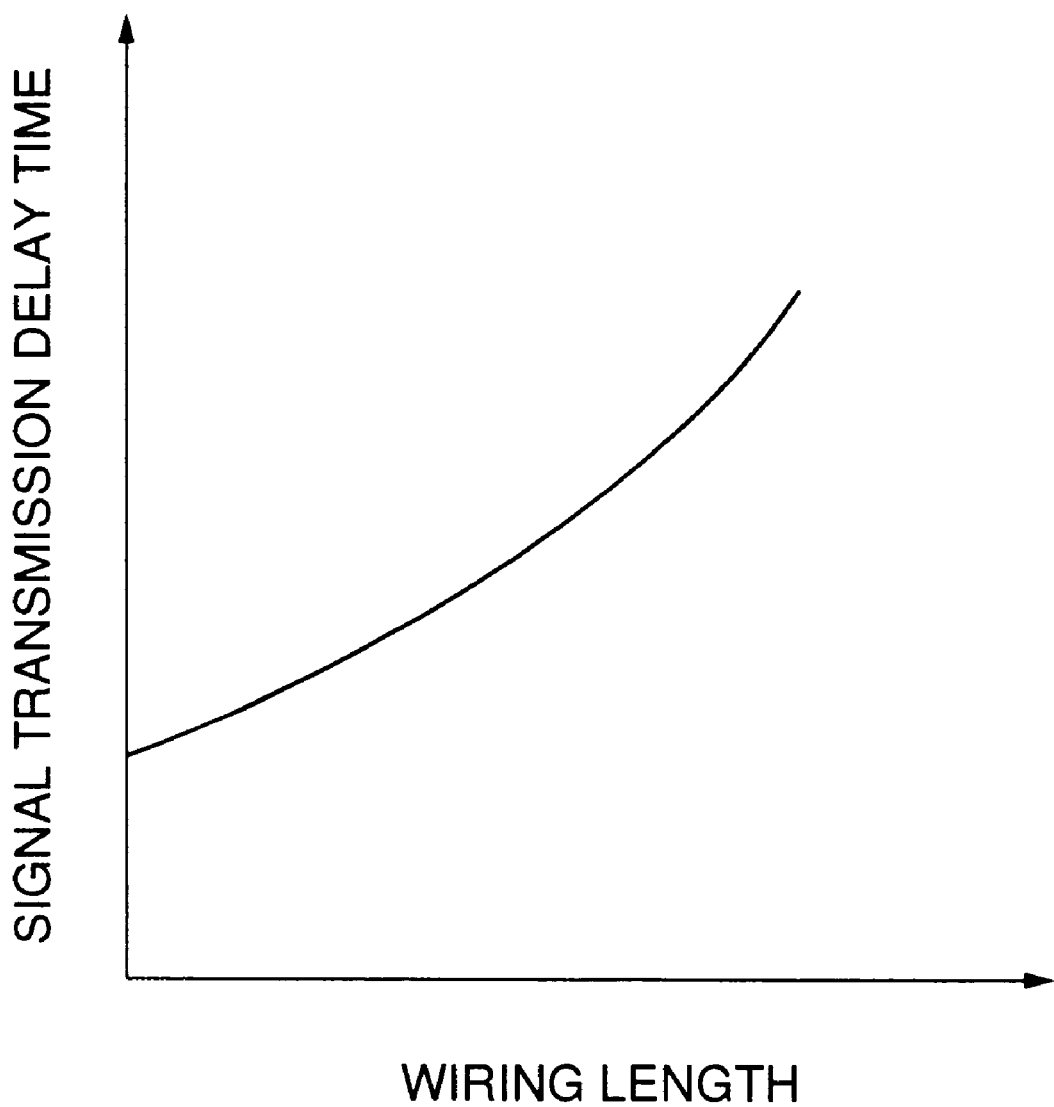
FIG. 2 is a characteristic chart showing a relation of the signal transmission delay time against the wiring length.

The transmission delay time is obtained from the characteristics of the signal transmission delay time against the wiring length as shown in FIG. 2. The characteristics of the signal transmission delay time against the wiring length can be obtained from the data measured on real test semiconductor chips. Or, it can be obtained from a circuit simulation with the electric characteristics of the resistors and capacitors of the buffer means 1, the output signal characteristics against the input signal of the clock signal input means 3, and the electric characteristics of the resistors and capacitors of the wiring means 4. Or, the transmission delay time can also be obtained using an approximation formula such as Elmore delay formula shown in "W. C. Elmore: The Transient Response of Damped Linear Networks with Particular Regard to Wideband Amplifiers, Journal of Applied Physics, Vol. 10 (1948), pp. 55–63.

Furthermore, the signal transmission delay time from the buffer means 1 to each of the load means 2 can be calculated by obtaining the wiring path to make the skew of the clock signals zero (to make equal all of the signal transmission delay time from the buffer means 1 to each of the load means 2). The wiring path to make the skew of clock signals from one buffer means to a plurality of loads zero can be determined, for example, by the method disclosed in Japanese Patent Laid-open No. Hei-7-121261. This method generates the wiring path in the following way.

In FIG. 1, first a pair of the loads 2 is optionally selected. Here, the pair selection is made out of the two of the loads 2 whose distance in-between is the shortest. Next, the path between the pair of the foregoing loads is determined. Here, the path is to be determined so as to make the wiring length the shortest. Next, the wiring branch point 5-1 is set on the foregoing path. The characteristics of the signal transmission delay time against the wiring length can also be obtained as to the wiring from the wiring branch point 5-1 to each of the loads 2. With this characteristics, the wiring branch point 5-1 is determined so as to equalize the signal transmission delay time from the 10 wiring branch point 5-1 to each of the loads 2 contained in the foregoing pair of loads.

Next, in the same manner as the foregoing technique, the path between the wiring branch point 5-1 and the loads 2 which were not selected for the foregoing loads 2 is determined, on which the wiring branch point 5-2 is set.

Here, the branch point 5-2 is set so as to equalize all of the signal transmission delay time from the branch point 5-2 to each of all the load means 2.

Then, by determining wiring paths form the buffer means 1 to the load means 2 through wiring branch 5-1 and 5-2, the wiring paths make the skew of clock signals from the buffer means 1 to the load means 2 zero. For each position of the buffer means 1, the signal transmission delay time from the buffer means 1 to the load means 2 can be obtained by the signal transmission delay time on the wiring paths.

Thus, the signal transmission delay time from the clock signal input means 3 to the buffer means 1 and the signal transmission delay time from the buffer means 1 to each of the loads 2 are obtained for all the positions at which the buffer means 1 can be disposed; and therefore, when the ratio between the signal transmission delay time from the clock signal input means 3 to the buffer means 1 and the signal transmission delay time from the buffer means 1 to each of the loads 2 is given, it becomes possible to dispose the buffer means 1 so as to adjust the signal transmission delay time as well as to adjust the skew of clock signals, and to configurate the clock signal distributing circuit by wiring based on the foregoing paths.

Figure 3:
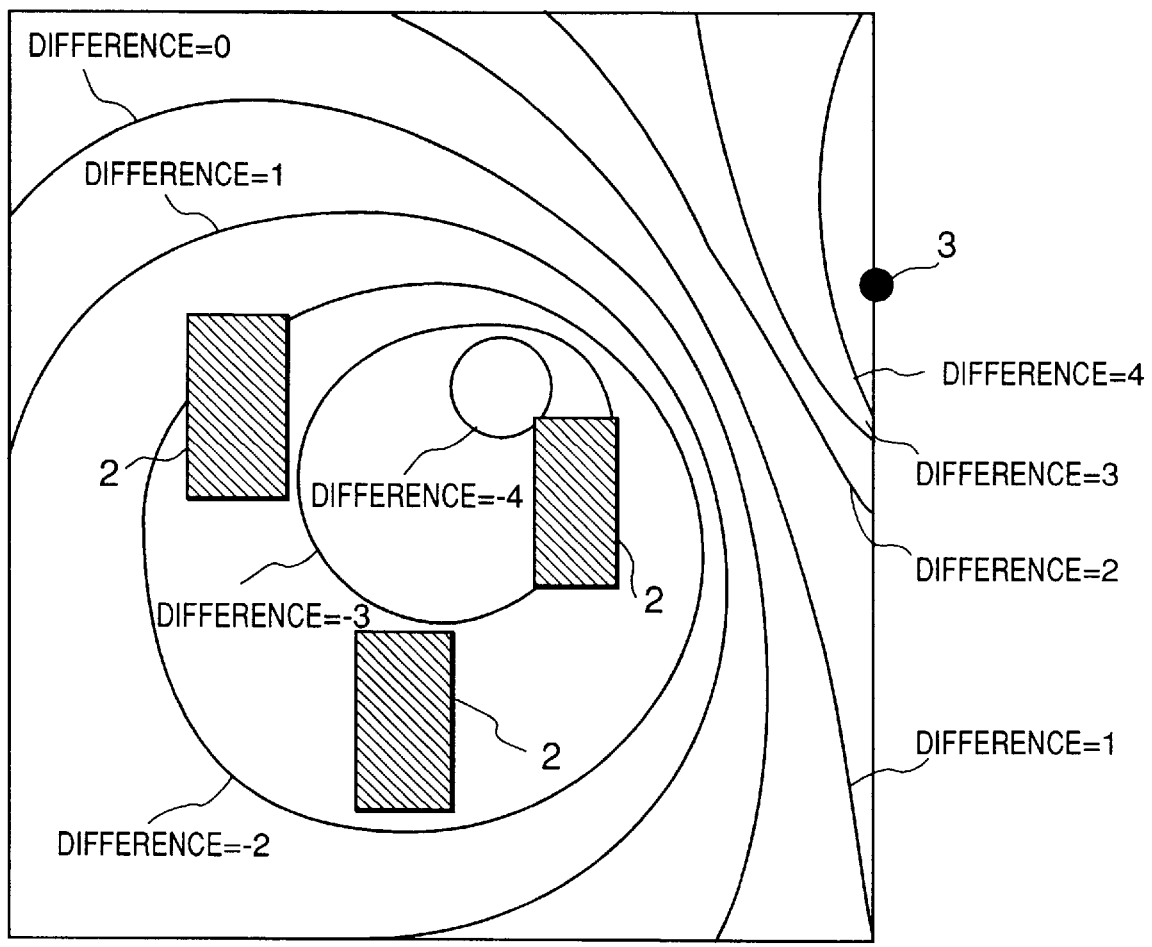
FIG. 3 is a characteristic chart showing a relation between the difference of the signal transmission delay time and the position of the buffer means.

It is also possible to dispose the buffer means 1 so as to make the signal transmission delay time from the clock signal input means 3 to the buffer means 1 equal to the signal transmission delay time from the buffer means 1 to each of the loads 2. In this case, as for all the positions at which the buffer means 1 can be disposed, the differences between the signal transmission delay time from the clock signal input means 3 to the buffer means 1 and the signal transmission delay time from the buffer means 1 to each of the loads 2 are calculated. The differences vary depending on the positions of the buffer means 1, and plotting the positions having the same difference can draw a contour map as shown in FIG. 3. On this contour map, while making the differences zero, the position for the buffer means 1 is determined so as to minimize the signal transmission delay time from the clock signal input means 3 to each of the loads 2.

Figure 4:
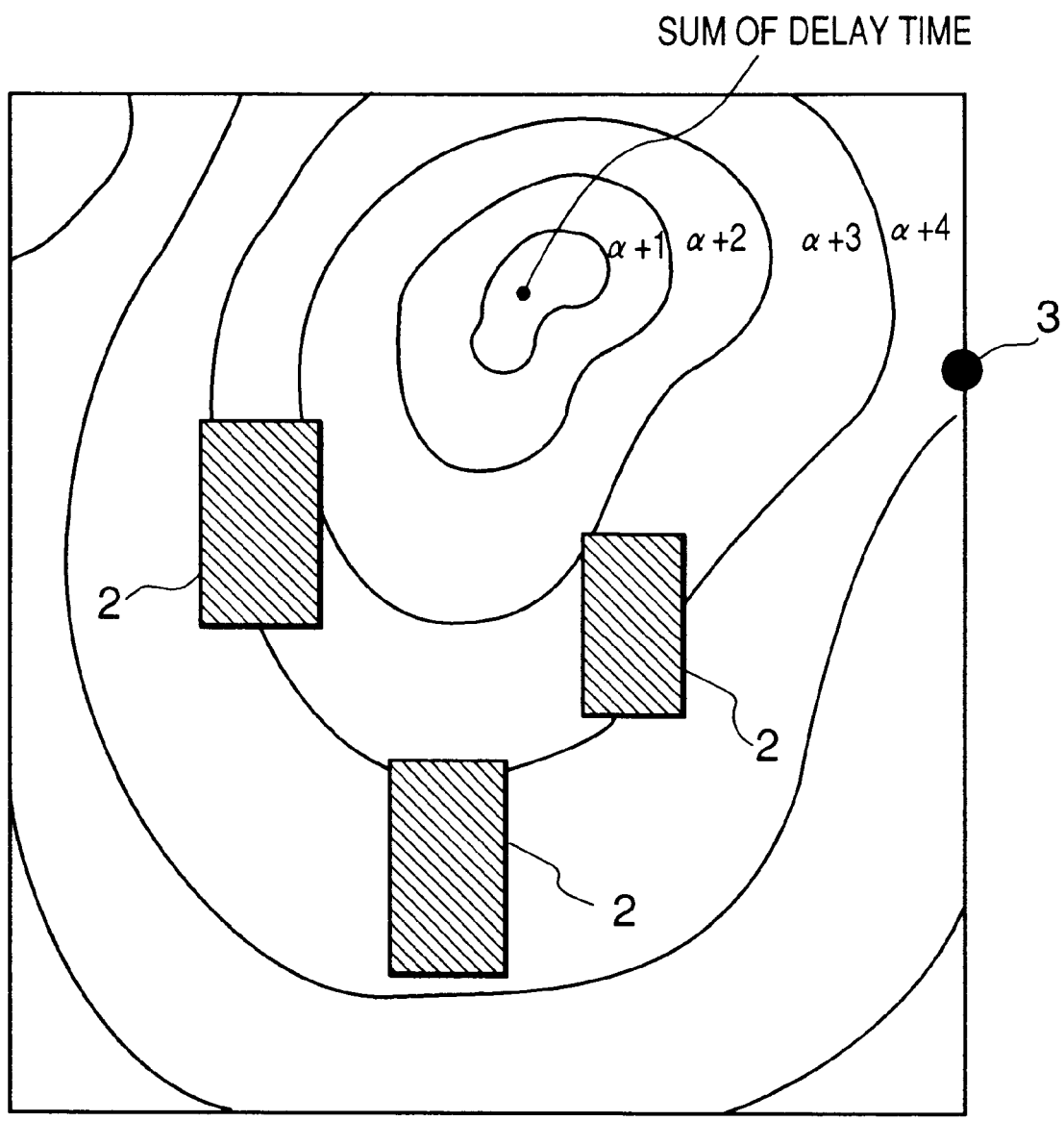
FIG. 4 is a characteristic chart showing a relation between the sum of the signal transmission delay time and the position of the buffer means.

Furthermore, disposing the buffer means 1 so as to minimize the sum of the signal transmission delay time from the clock signal input means 3 to the buffer means 1 and the signal transmission delay time from the buffer means 1 to each of the loads 2 will minimize the signal transmission delay time from the clock signal input means 3 to each of the loads 2. As for all the positions at which the buffer means 1 can be disposed, the sums of the signal transmission delay time from the clock signal input means 3 to the buffer means 1 and the signal transmission delay time from the buffer means 1 to each of the loads 2 are calculated. The sums vary depending on the positions of the buffer means 1, and plotting the positions having the same sum can draw a contour map as shown in FIG. 4. On this contour map, the position for the buffer means 1 can be determined so as to minimize the sums.

Next, the clock signal distributing circuit having plural stage buffers will be described with reference to FIG. 5.

Figure 5:
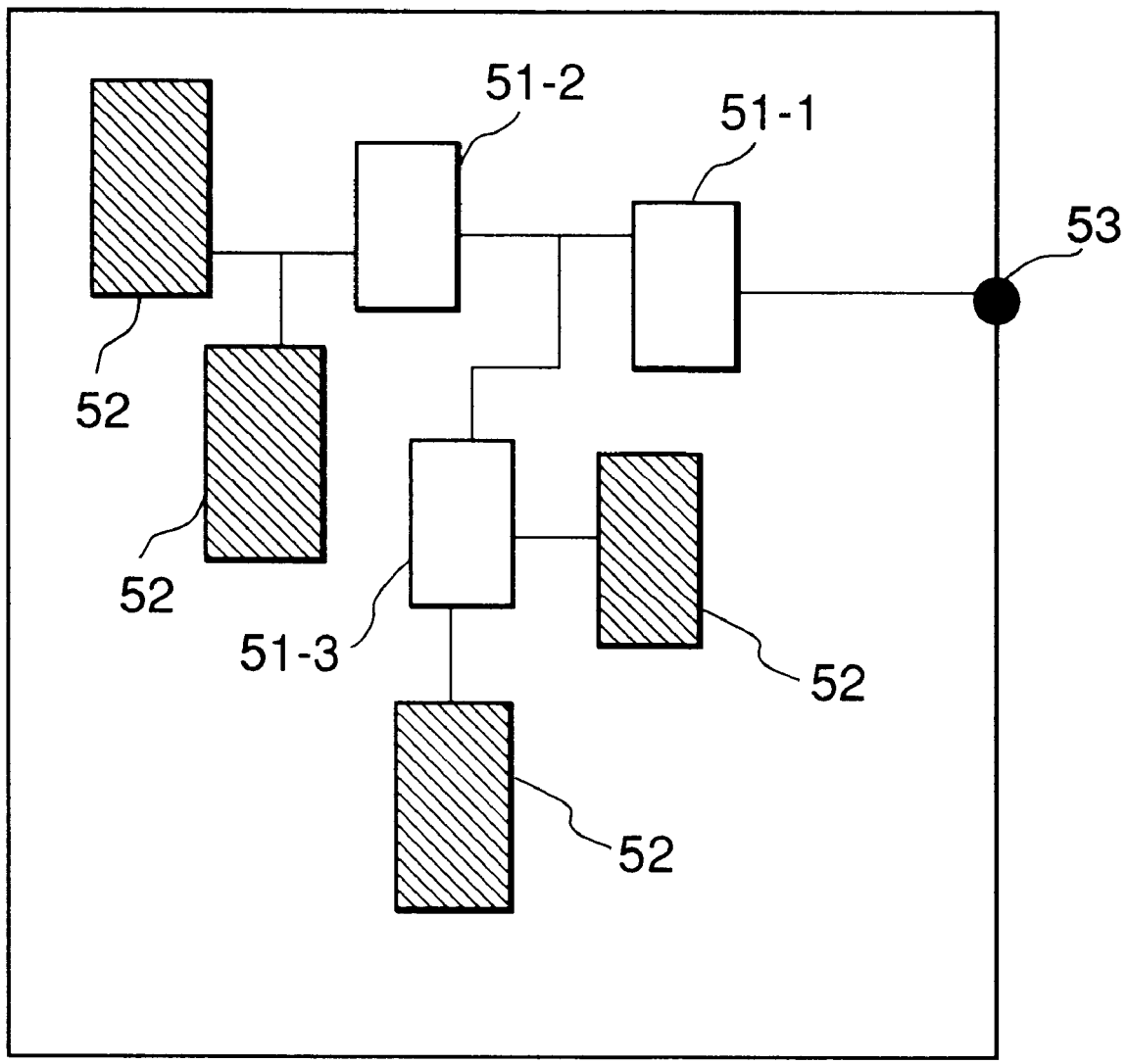
FIG. 5 illustrates a clock signal distributing circuit having plural stage buffer means according to the invention.
Figure 6:
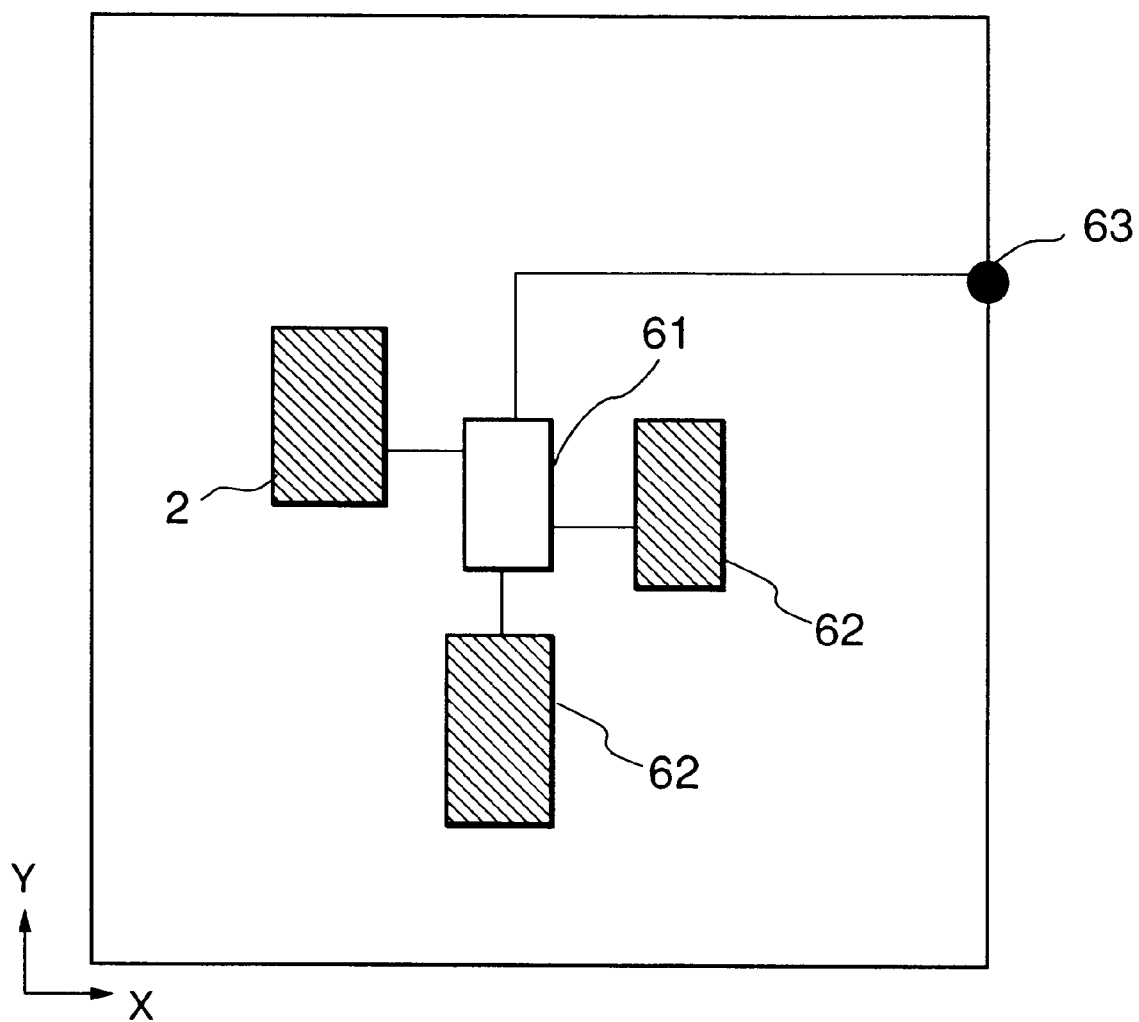
FIG. 6 illustrates a conventional clock signal distributing circuit.

In FIG. 5, there are three buffer means in total and two stage buffer means between the clock signal input means 53 and each of the loads 52, that is, the buffer means of two stages 51-1- 51-2, and 51-1 - 51-3. In this case, the characteristics of the signal transmission delay time against the wiring length as shown in FIG. 2 can be obtained: as to the signal transmission delay time from the clock signal input means 53 to the buffer means 51-1, the signal transmission delay time from the buffer means 51-1 to each of the buffer means 51-2 and the buffer means 51-3, the signal transmission delay time from the buffer means 51-2 to each of the loads 52, and the signal transmission delay time from the buffer means 51-3 to each of the loads 52. Through determining the positions of the buffer means 51-1 through 51-3 using the foregoing characteristics, the clock signal distributing circuit in which the signal transmission delay time as well as the skew of clock signals can be adjusted will be attained.

In case of plural stage buffer means, in the same manner as in one stage buffer means, minimizing the differences of the transmission delay time of signals sent out from the clock signal input means 53 and the buffer means 51-1 to 51-3, or minimizing the signal transmission delay time from the clock signal input means 53 to each of the loads 52 will reduce the transmission delay time of clock signals as well as to reduce the skew of clock signals.

The foregoing minimization can be achieved by the following calculation. Here, the transmission delay time of signals sent out from the clock signal input means 53 is regarded as t0. t0 is determined from the positions of the clock signal input means 53 and the buffer means 51-1, giving the relation as shown in FIG. 2. In the same manner, the transmission delay time of signals sent out from the buffer means 51-1 through 51-3 are regarded as t1, t2, and t3, respectively.

Here, the minimization of the differences of the signal transmission delay time can be achieved, while varying the positions of the buffer means 51-1 through 51-3, by minimizing $$F=(t0-t1)^2+(t0-t2)^2+(t0-t3)^2+(t1-t2)^2+(t1-t3)^2+(t2-t3)^2.$$

Considering all the possible positions for each of the buffer means 51-1 through 51-3, calculating t0, t1, and t3 and values of F are calculated. Among them, each of the positions at which the buffer means 51-1 through 51-3 are disposed is selected from the calculated value to minimize F. This minimization can be solved by means of the conventional nonlinear programming.

Further, the minimization of the signal transmission delay time from the clock signal input means 53 to each of the loads 52 can be achieved, while minimizing $F1=(t2-t3)^2$, by minimizing $F2=t0+t1+t2$.

F1 and F2 can also be minimized while varying the positions of the buffers 51-1 through 51-3, and in addition can be done by the conventional nonlinear programming.

In the foregoing embodiment, the signal transmission delay time from the clock signal input means to the buffer means, from the buffer means to the loads means, and from the buffer means to the other buffer means have been calculated by using the characteristics of the signal transmission delay time against the wiring length as in FIG. 2, and the positions of the buffer means have been determined. In replacement of the signal transmission delay time by this method, the determination by using the wiring length estimated by means of the conventional wiring technique or the distance can simplify the calculation and speed up the processing.

Next, the operation of the circuit in FIG. 1 will be described.

The clock signal entering from the clock signal input means 3 transmits to each of the loads 2 through the buffer means 1. If the wiring path from the buffer means 1 to each of the load means 2 is designed, for example, by means of the method disclosed in the foregoing Japanese Patent Laid-open No. 7-121261, the clock signal transmits to each of the loads 2 in a minimum skew.

The position of the buffer means 1 is determined such that the signal transmission delay time from the clock signal input means 3 to each of the loads 2 is minimum, therefore, this circuit is regarded as a clock signal distributing circuit in which the signal transmission delay time is minimum.

The clock signal input means may be an input pad of the integrated circuit or an output of a clock signal generating circuit; the buffer means may be an inverter of a CMOS circuit; the load means may be a flip-flop; and the wiring means may be an aluminum wiring.

Further, in case of plural stage buffer means as shown in FIG. 5, if the wiring path from the buffer means 51 to each of the load means 52 is designed, for example, by means of the method disclosed in the foregoing Japanese Patent Laid-open No. Hei 7-121261, the clock signal transmits to each of the loads 2 in a minimum skew.

In addition to this, to minimize the differences of the transmission delay time of signals distributed from the clock signal input means or the buffer means will minimize the maximum value of the transmission delay time of the signals. Still, to minimize the sums of the signal transmission delay time from the clock signal input means to the buffer means, the signal transmission delay time from the buffer means to the other buffer means, and the signal transmission delay time from the buffer means to the load means will minimize the signal transmission delay time from the clock signal input means to the load means.

Furthermore, using a wiring length or a distance as an approximation for the signal transmission delay time can speed up the processing.

As described hereinabove, the present invention has an effect that the signal transmission delay time can be adjusted while the skew of clock signals are adjusted.

This effect results from the fact that the positions of the buffer means are determined on the basis of the position and characteristics of the clock signal input means and loads and the characteristics of the buffer means and wiring means, and wirings are made through the clock signal input means, the buffer means, and the loads.

What is claimed is:

1. A clock signal distributing circuit comprising clock signal input means, buffer means, a plurality of load means, and wiring means connecting between said clock signal input means and said buffer means and between said buffer means and a plurality of said load means, wherein a first signal transmission delay time from said clock signal input means to said buffer means and a second signal transmission delay time from said buffer means to said load means are obtained, a position at which said buffer means is disposed is determined from said obtained first and second signal transmission delay times, and a position of a wiring path of said wiring means is determined from said obtained first and second signal transmission delay times.

2. A clock signal distributing circuit as claimed in claim 1, wherein said signal transmission delay time is calculated on the basis of a distance between a signal input terminal and a signal output terminal.

3. A clock signal distributing circuit as claimed in claim 1, wherein said signal transmission delay time is calculated on the basis of a wiring length between a signal input terminal and a signal output terminal.

4. A clock signal distributing circuit as claimed in claim 1, wherein the position at which said buffer means is disposed is determined so as to minimize a third signal transmission delay time from said clock signal input means to said load means.

5. A clock signal distributing circuit as claimed in claim 4, wherein the position at which the buffer means is disposed is determined so as to make said first signal transmission delay time equal to said second signal transmission delay time, in order to minimize said third signal transmission delay time.

6. A clock signal distributing circuit as claimed in claim 4, wherein the position at which the buffer means is disposed is determined so as to minimize the sum of said first signal transmission delay time and said second signal transmission delay time, in order to minimize said third signal transmission delay time.

7. A clock signal distributing circuit as claimed in claim 4, wherein said signal transmission delay time is calculated on the basis of a distance between a signal input terminal and a signal output terminal.

8. A clock signal distributing circuit as claimed in claim 4, wherein said signal transmission delay time is calculated on the basis of a wiring length between a signal input terminal and a signal output terminal.

9. A clock signal distributing circuit as claimed in claim 1, wherein the first and second signal transmission delay times are obtained from the characteristics of the signal transmission delay times against the wiring length composed from:

a position of said clock signal input means, electric characteristics of resistors and capacitors and the like constituting the clock signal input means, and output signal characteristics against input signal waveforms thereof;

positions of said load means, the electric characteristics of resistors and capacitors and the like constituting the load means, and the output signal characteristics against the input signal waveforms thereof;

the electric characteristics of resistors and capacitors and the like constituting said buffer means, and the output signal characteristics against the input signal waveforms thereof; and the electric characteristics of wiring resistors and wiring capacitors constituting said wiring means.

10. A clock signal distributing circuit as claimed in claim 9, wherein the position at which said buffer means is disposed is determined so as to minimize a third signal transmission delay time from said clock signal input means to said load means.

11. A clock signal distributing circuit as claimed in claim 10, wherein said signal transmission delay time is calculated on the basis of a distance between a signal input terminal and a signal output terminal.

12. A clock signal distributing circuit as claimed in claim 10, wherein said signal transmission delay time is calculated on the basis of a wiring length between a signal input terminal and a signal output terminal.

13. A clock signal distributing circuit comprising clock signal input means, a plurality of load means, plural stage buffer means disposed between said clock signal input means and said load means, and wiring means connecting between said clock signal input means and said buffer means, between said plural stage buffer means, and between said buffer means and said load means, wherein a first signal transmission delay time of an output signal from said clock signal input means to said buffer means and a plurality of second signal transmission delay times of output signals from a plurality of said buffer means to said load means are obtained, positions at which a plurality of said buffer means are disposed are determined from said obtained first and a plurality of said second signal transmission delay times, and a position of a wiring path of said wiring means is determined from said obtained first and a plurality of said second signal transmission delay times.

14. A clock signal distributing circuit as claimed in claim 13, wherein said first signal transmission delay time and a plurality of said second signal transmission delay times are obtained from the characteristics of the signal transmission delay times against the wiring length composed from:

a position of said clock signal input means, electric characteristics of resistors and capacitors and the like constituting the clock signal input means, and output signal characteristics against the input signal waveforms thereof;

positions of said load means, the electric characteristics of resistors and capacitors and the like constituting the load means, and the output signal characteristics against the input signal waveforms thereof;

the electric characteristics of resistors and capacitors and the like constituting said buffer means, and the output signal characteristics against the input signal waveform thereof; and the electric characteristics of wiring resistors and wiring capacitors constituting said wiring means.

15. A clock signal distributing circuit as claimed in claim 13, wherein said signal transmission delay time is calculated on the basis of a distance between a signal input terminal and a signal output terminal.

16. A clock signal distributing circuit as claimed in claim 13, wherein said signal transmission delay time is calculated on the basis of a wiring length between a signal input terminal and a signal output terminal.

17. A clock signal distributing circuit as claimed in claim 13, wherein said plural stage buffer means are disposed so as to minimize a third signal transmission delay time from said clock signal input means to said load means.

18. A clock signal distributing circuit as claimed in claim 17, wherein said plural stage buffer means are disposed so as to equalize all of said first signal transmission delay time and a plurality of said second signal transmission delay times, in order to minimize said third signal transmission delay time.

\* \* \* \* \*